US008681803B2

(12) United States Patent
Morita et al.

(10) Patent No.: US 8,681,803 B2
(45) Date of Patent: Mar. 25, 2014

(54) COMMUNICATION SYSTEM, POLICY MANAGEMENT APPARATUS, COMMUNICATION METHOD, AND PROGRAM

(75) Inventors: Yoichiro Morita, Tokyo (JP); Masayuki Nakae, Tokyo (JP); Masaya Yamagata, Tokyo (JP); Takayuki Sasaki, Tokyo (JP); Hideyuki Shimonishi, Tokyo (JP); Kentaro Sonoda, Tokyo (JP); Yoichi Hatano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/822,547

(22) PCT Filed: Sep. 14, 2012

(86) PCT No.: PCT/JP2012/073711
§ 371 (c)(1),
(2), (4) Date: Mar. 12, 2013

(87) PCT Pub. No.: WO2013/042634
PCT Pub. Date: Mar. 28, 2013

(65) Prior Publication Data
US 2013/0195112 A1 Aug. 1, 2013

(30) Foreign Application Priority Data

Sep. 20, 2011 (JP) ................................. 2011-204487

(51) Int. Cl.
*H04L 12/28* (2006.01)
(52) U.S. Cl.
USPC ............ 370/400; 370/231; 370/401; 709/227
(58) Field of Classification Search
None
See application file for complete search history.

(56) References Cited

U.S. PATENT DOCUMENTS 6,088,451 A * 7/2000 He et al. ............................. 726/8
7,225,263 B1 * 5/2007 Clymer et al. ................ 709/229
(Continued)

FOREIGN PATENT DOCUMENTS

| CN | 101945432 A | 1/2011 |
| JP | 200462417 A | 2/2004 |

(Continued)

OTHER PUBLICATIONS

The international search report for PCT/JP2012/073711 mailed on Nov. 6, 2012.

(Continued)

*Primary Examiner* — Duc C Ho
(74) *Attorney, Agent, or Firm* — Sughrue Mion, PLLC (57) ABSTRACT

Authentication apparatus authenticates user using host connected to forwarding node. Policy management apparatus holds access control policy for identifying host under access control using identifier of forwarding node or identifier of user, and links identifier of host under access control and identifier of forwarding node to which host is connected, or identifier of host under access control and identifier of user using host. Forwarding node transmits to policy management apparatus identifier of host connected to own forwarding node and identifier of own forwarding node. Authentication apparatus transmits to policy management apparatus identifier of host connected to forwarding node and identifier of user. Policy management apparatus refers to access control policy and, if host connected to forwarding node is under access control, notifies content of access control to control apparatus as access control list. Control apparatus generates processing rule in accordance with access control list and sets generated processing rule in forwarding nodes.

15 Claims, 3 Drawing Sheets

(56) References Cited

U.S. PATENT DOCUMENTS

2009/0138577 A1    5/2009  Casado et al.
2013/0148500 A1*   6/2013  Sonoda et al. ............... 370/231

FOREIGN PATENT DOCUMENTS

| JP | 2010541426 A | 12/2010 |
| WO | 2008/095010 A1 | 8/2008 |
| WO | 2011081104 A1 | 7/2011 |
| WO | 2012086816 A1 | 6/2012 |

OTHER PUBLICATIONS

Nick McKeown et al., "OpenFlow: Enabling Innovation in Campus Networks", Mar. 14, 2008.
OpenFlow Switch Specication Version 1.1.0 Implemented ( Wire Protocol 0×02 ), Feb. 28, 2011.
The Written Opinion of International Preliminary Examination Authority for PCT/JP2012/073711.
Chinese Office Action for CN Application No. 201280002891.3 issued on Sep. 4, 2013 with Partial English Translation of p. 6 (Search Report).

* cited by examiner

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

⎫
⎬ Header Fields; MATCHING RULE
⎭

COMMUNICATION SYSTEM, POLICY MANAGEMENT APPARATUS, COMMUNICATION METHOD, AND PROGRAM

CROSS-REFERENCE TO RELATED APPLICATIONS

The present application is a National Stage Entry of PCT/JP2012/073711 (filed Sep. 14, 2012), which is based upon and claims the benefit of the priority of Japanese Patent Application No. 2011-204487 (filed on Sep. 20, 2011), the disclosures of all which are incorporated herein in their entirety by this reference.

TECHNICAL FIELD

The present invention relates to a communication system, a policy management apparatus, a control method, and a program. More specifically, the invention relates to a communication system, a policy management apparatus, a communication method, and a program for implementing communication by forwarding a packet using a forwarding node disposed on a network.

BACKGROUND

Patent Literature (PTL) 1, Non Patent Literatures (NPLs) 1 and 2 describe a technology referred to as OpenFlow (OpenFlow). In the OpenFlow, communication is regarded as an end-to-end flow, and path control, failure recovery, load distribution, and path optimization are performed on a per-flow basis.

An OpenFlow switch specified in Non Patent Document 2 includes a secure channel for communication with an OpenFlow controller corresponding to a control apparatus. The OpenFlow switch operates according to a flow table in which appropriate adding or rewriting is instructed by the OpenFlow controller.

Figure 3:
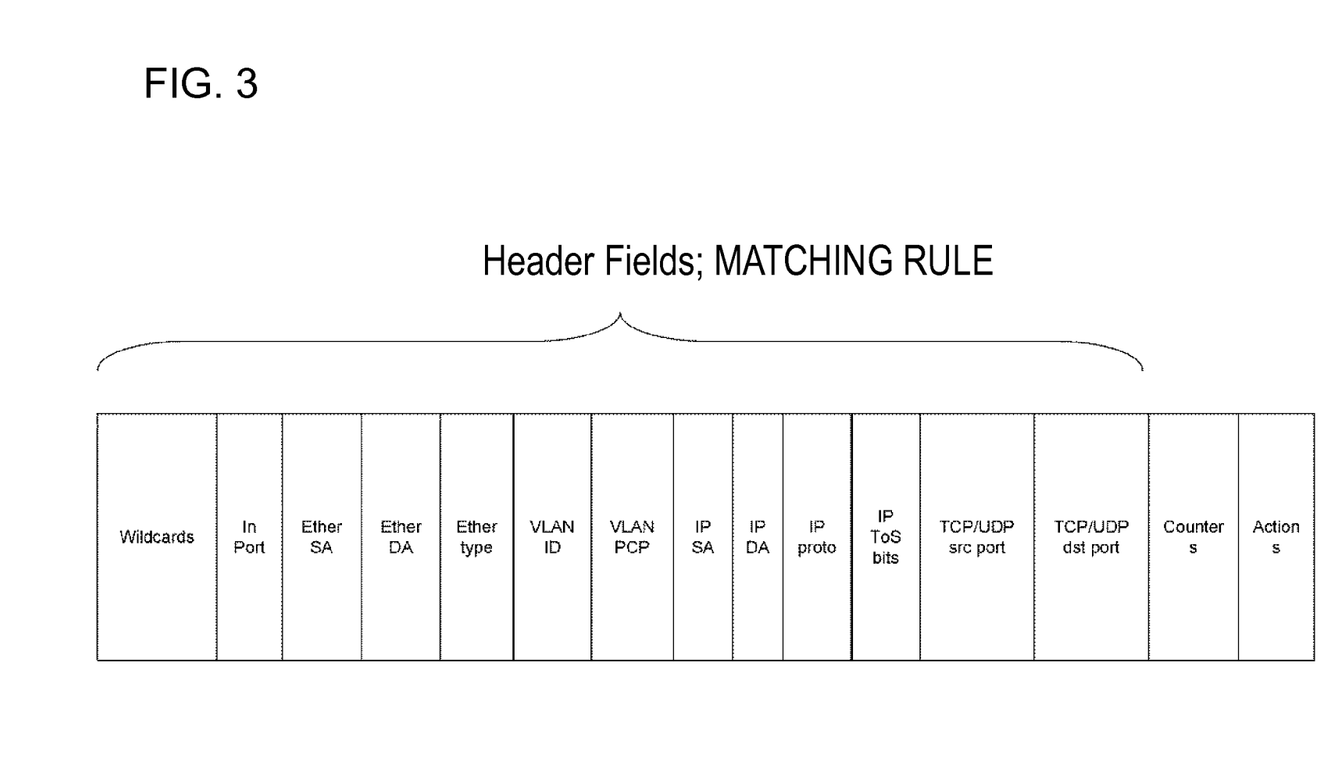
FIG. 3 is a diagram showing a configuration of an entry stored in an OpenFlow flow table (in Non Patent Literature 2).

In the flow table, a set of a matching rule (header fields) to be matched against a packet header, flow statistics information (counters), and actions defining processing content is defined for each flow (refer to FIG. 3).

When the OpenFlow switch receives a packet, the OpenFlow switch searches the flow table for an entry having a matching rule that matches header information of the received packet (refer to the header fields in FIG. 3).

When the entry that matches the received packet is found as a result of the search, the OpenFlow switch updates the flow statistics information (one or more counters), and executes processing content (e.g., transmission of the packet from a specified port, flooding of the packet, discarding of the packet, or the like) described in the action field of the entry.

On the other hand, when the entry that matches the received packet is not found as a result of the search, the OpenFlow switch forwards the received packet to the OpenFlow controller through the secure channel, and requests the OpenFlow controller to determine a path of the packet, based on the transmission source and the transmission destination of the received packet. The OpenFlow switch receives a flow entry for implementing forwarding of the packet according to this path, and then updates the flow table.

In this manner, the OpenFlow switch performs packet forwarding by using an entry stored in the flow table as a processing rule.

[PTL 1]
International Publication No. WO2008/095010
[NPL 1]
Nick McKeown and seven other authors, "OpenFlow: Enabling Innovation in Campus Networks," Mar. 14, 2008 [on line], [Searched on Sep. 7, 2011], Internet <URL: http://www.openflowswitch.org/documents/openflow-wp-latest.pdf>.
[NPL 2]
"OpenFlow Switch Specification, Version 1.1.0 Implemented (Wire Protocol 0x02)," Feb. 28, 2011, [online], [Searched on Sep. 7, 2011], Internet <URL: http://www.openflowswitch.org/documents/openflow-spec-v1.1.0.pdf>.

SUMMARY

Each disclosure of the above-listed Patent Literature and Non Patent Literatures is incorporated herein by reference thereto. The following analysis is made by the present invention.

The OpenFlow controller or the controller in the OpenFlow described in Patent Literature 1 performs a permission check by referring to an access control rule when a new flow is generated. Then, the OpenFlow controller performs access control by calculating the path (refer to [0052] in Patent Literature 1).

The access control rule to be referred to when the new flow is generated is herein updated by receipt of an access control list (ACL: Access Control List) generated by a policy management apparatus.

When the policy management apparatus generates the ACL, information on the host of an access source and information on the network resource of an access destination are needed.

Even if a network administrator or a user who demands the access control manually supplies these pieces of information to the policy management apparatus, the access control can be performed. However, it takes much time and effort for the network administrator or the user to perform the access control by this method, thereby making it difficult to perform the access control in a large-sized network or in an environment where the connection state of the host or the network resource frequently changes.

On the other hand, if an operation of collecting these pieces of information can be automated by a system, the time and effort to be expended by the network administrator or the user can be greatly reduced. In this case, it becomes possible to perform the access control in the large-sized network or the environment where the connection state of the host or the network resource frequently changes, with the time and effort saved in a simple and practical way.

An access control policy that specifies the information on the host and the information on the network resource is used for the policy management apparatus in order to set access control content.

The policy management apparatus generates the ACL, based on the access control policy.

Upon specifying the information on the host and the information on the network resource in the access control policy, it is necessary to specify current address information that will become identifiers of the host and the network resource in the network environment.

When the location or the connection state of the host or the network resource to be subject to the access control is changed, birth and death or an address change of the host or the network resource on the network occurs. In order to properly perform the access control, the access control policy must be updated in real time according to the change with respect to the host or the network resource, a new ACL must be generated from the updated access control policy, and then the access control rule held by the control apparatus must be updated.

Even if the network administrator or the user who demands the access control manually supply these pieces of information to the policy management apparatus, the access control can be performed. However, by this method, it takes much time and effort for the network administrator or the user to perform the access control. Consequently, it becomes difficult to perform the access control in the large-sized network or in the environment where the connection state of the host or the network resource frequently changes.

Assume that the operation of specifying these pieces of information be semi-automated by the system, on the other hand. Then, if there could be provided to the network administrator or the user an abstract and easily comprehensible specifying method that will automatically follow a change once these pieces of information have been specified, by this semi-automation, the time and effort to be expended by the network administrator or the user could be greatly reduced. In this case, it would become possible to perform the access control in the large-sized network or in the environment where the connection state of the host or the network resource frequently changes, with the time and effort saved in a simple and practical way.

However, in order to achieve the solution as described above, there is needed a function of collecting the current connection state of the host of the access source or information on the network resource of the access destination in real time and searching out information on a specific host or a specific network resource based on an abstract specification described in the access control policy.

Then, there is a need that access control can be updated in real time even if there are a lot of devices and connection states of the devices frequently change or even if there are a lot of users and connection states of the users frequently change.

According to a first aspect of the present invention, there is provided a communication system, comprising:

a plurality of forwarding node processing a packet according to a processing rule;

a control apparatus that controls the plurality of forwarding nodes;

an authentication apparatus that authenticates a user who uses a host connected to one of the plurality of forwarding nodes; and a policy management apparatus that includes at least one of (a) a first linking unit that links an identifier of a host to be subject to access control and an identifier of a forwarding node to which the host is connected and (b) a second linking unit that links an identifier of a host to be subject to access control and an identifier of a user who uses the host, the policy management apparatus holding an access control policy for identifying a host to be subject to the access control using at least one of the identifier of the forwarding node and the identifier of the user, wherein each of the plurality of forwarding nodes transmits to the policy management apparatus a set of an identifier of a host connected to own forwarding node and an identifier of the own forwarding node;

the authentication apparatus transmits to the policy management apparatus a set of an identifier of a host connected to one of the plurality of forwarding nodes and an identifier of a user, the policy management apparatus refers to the access control policy and, if a host connected to one of the plurality of forwarding nodes is a host to be subject to the access control, notifies content of the access control to the control apparatus as an access control list, and the control apparatus generates a processing rule in accordance with the access control list and sets the generated processing rule in the plurality of forwarding nodes.

According to a second aspect of the present invention there is provided a policy management apparatus in a communication system comprising a plurality of forwarding nodes processing a packet according to a processing rule, a control apparatus that generates the processing rule in accordance with an access control list and sets the processing rule in the plurality of forwarding nodes, and an authentication apparatus that authenticates a user who uses a host connected to one of the plurality of forwarding nodes; the policy management apparatus comprising:

at least one of (a) a first linking unit that links an identifier of a host to be subject to access control and an identifier of a forwarding node to which the host is connected, and (b) a second linking unit that links an identifier of a host to be subject to access control and an identifier of a user who uses the host; and an access control policy storage unit that holds an access control policy for identifying a host to be subject to the access control, using at least one of an identifier of a forwarding node and an identifier of a user, wherein the policy management apparatus receives from each of the plurality of forwarding nodes a set of an identifier of a host connected to own forwarding node and an identifier of the own forwarding node, the policy management apparatus receives from the authentication apparatus a set of an identifier of a host connected to one of the plurality of forwarding nodes and an identifier of a user, and the policy management apparatus refers to the access control policy and, if a host connected to one of the plurality of forwarding nodes is a host to be subject to the access control, notifies content of the access control to the control apparatus as the access control list.

According to a third aspect of the present invention there is provided a communication method in a communication system comprising a plurality of forwarding nodes, a control apparatus that controls the plurality of forwarding nodes, an authentication apparatus that authenticates a user who uses a host connected to one of the plurality of forwarding nodes, and a policy management apparatus that holds an access control policy for identifying a host to be subject to access control using at least one of an identifier of a forwarding node and an identifier of a user, the communication method comprising:

by each of the plurality of forwarding nodes, transmitting to the policy management apparatus a set of an identifier of a host connected to own forwarding node and an identifier of the own forwarding node;

by the authentication apparatus, transmitting to the policy management apparatus a set of an identifier of a host connected to one of the plurality of forwarding nodes and an identifier of a user;

by the policy management apparatus, performing at least one of (a) linking an identifier of a host to be subject to the access control and an identifier of a forwarding node to which the host is connected, and (b) linking an identifier of a host to be subject to the access control and an identifier of the user who uses the host;

by the policy management apparatus, referring to the access control policy and, if a host connected to one of the plurality of forwarding node is a host to be subject to access control, notifying to the control apparatus content of the access control as an access control list;

by the control apparatus, generating a processing rule for a packet in accordance with the access control list and setting the processing rule in the plurality of forwarding nodes; and by the plurality of forwarding nodes, processing a packet according to the processing rule.

According to a fourth aspect of the present invention there is provided a communication method in a communication system comprising a plurality of forwarding nodes processing a packet according to a processing rule, a control apparatus that generates the processing rule in accordance with an access control list and sets the processing rule in the plurality of forwarding nodes, and an authentication apparatus that authenticates a user who uses a host connected to one of the plurality of forwarding nodes;

the communication method comprising, by a policy management apparatus that holds an access control policy for identifying a host to be subject to access control using at least one of an identifier of a forwarding node and an identifier of a user:

at least one of (a) linking an identifier of a host to be subject to the access control and an identifier of a forwarding node to which the host is connected, and (b) linking an identifier of a host to be subject to the access control and an identifier of the user who uses the host;

receiving from each of the plurality of forwarding nodes a set of an identifier of a host connected to the each of the plurality of forwarding nodes and an identifier of the each of the plurality of forwarding nodes;

receiving from the authentication apparatus a set of an identifier of a host connected to one of the plurality of forwarding nodes and an identifier of a user; and referring to the access control policy and, if the host connected to one of the plurality of forwarding node is the host to be subject to the access control, notifying to the control apparatus content of the access control as the access control list.

According to a fifth aspect of the present invention there is provided a program executed on a computer provided in a policy management apparatus in a communication system, the communication system comprising a plurality of forwarding nodes processing a packet according to a processing rule, a control apparatus that generates the processing rule in accordance with an access control list and sets the processing rule in each of the plurality of forwarding nodes, and an authentication apparatus that authenticates a user who uses a host connected to one of the plurality of forwarding nodes, the policy management apparatus holding an access control policy for identifying a host to be subject to access control using at least one of an identifier of a forwarding node and an identifier of a user; the program causing the computer to execute:

at least one of (a) linking an identifier of a host to be subject to the access control and an identifier of a forwarding node to which the host is connected, and (b) linking an identifier of a host to be subject to the access control and an identifier of a user who uses the host;

receiving from each of the plurality of forwarding nodes a set of an identifier of a host connected to own forwarding node and an identifier of the own forwarding node;

receiving from the authentication apparatus a set of an identifier of a host connected to one of the plurality of forwarding nodes and an identifier of a user; and referring to the access control policy and, if the host connected to one of the plurality of forwarding node is the host to be subject to the access control, notifying to the control apparatus content of the access control as the access control list.

The present invention provides the following advantage, but not restricted thereto. According to the communication system, the policy management apparatus, the communication method, and the program, even if there are a lot of devices and connection states of the devices frequently change, or even if there are a lot of users and connection states of the users frequently change, it becomes possible to update access control in real time.

BRIEF DESCRIPTION OF DRAWINGS

[FIG. 1]

[FIG 2.]

[FIG. 3]

PREFERRED MODES

In the present disclosure, there are various possible modes, which include the following, but not restricted thereto. First, an overview of the present disclosure will be described. Reference symbols in drawings appended to this overview are illustrated solely for helping understanding, and are not intended to limit the present disclosure to the mode shown in the drawings.

Figure 1:
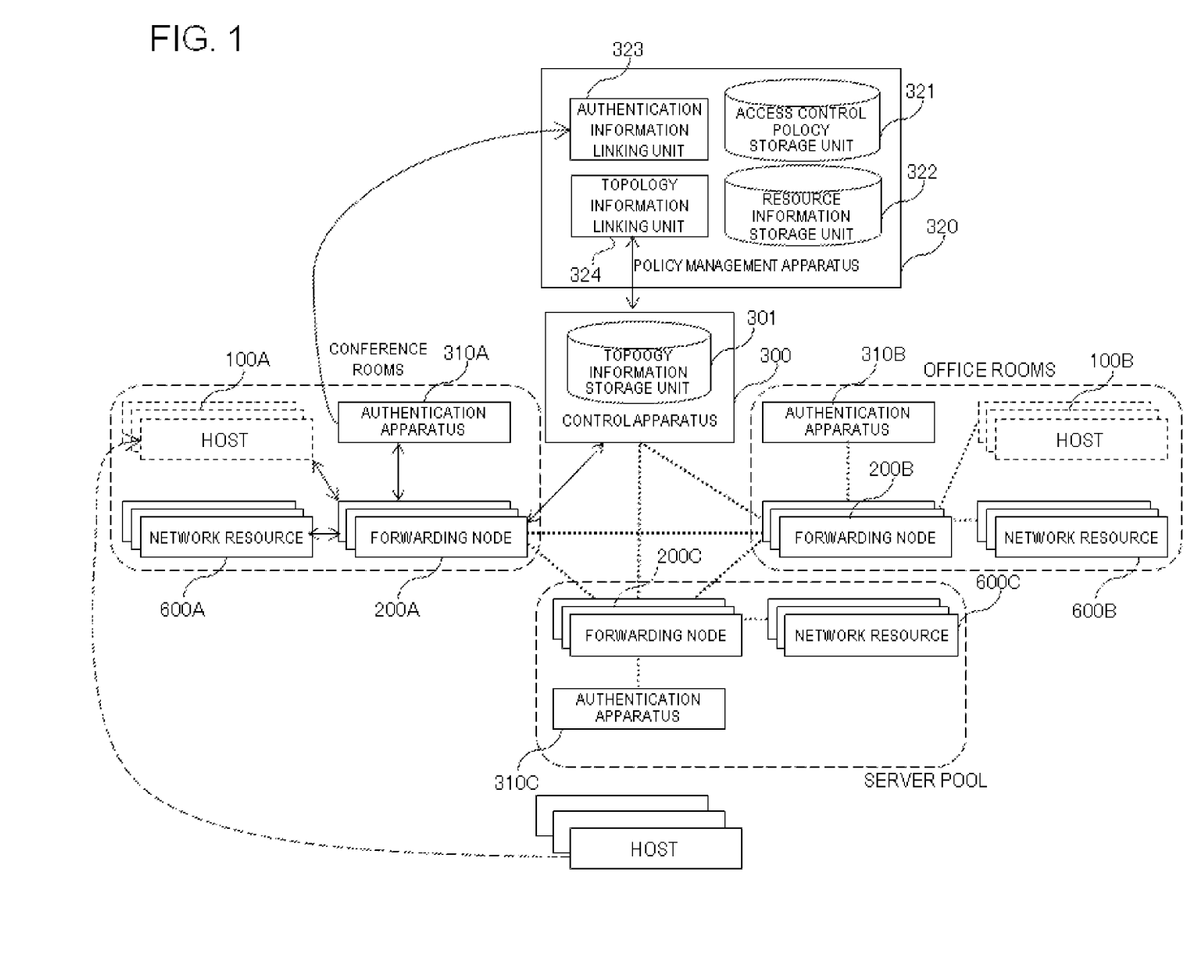
FIG. 1 is a block diagram showing a configuration of a communication system according to an exemplary embodiment, as an example.

Referring to FIG. 1, a communication system according to the present disclosure includes a plurality of forwarding nodes (200A to 200C) processing a packet according to a processing rule, a control apparatus (300) that controls the plurality of forwarding nodes, an authentication apparatus (310A, 310B, or 310C) that authenticates a user who uses one of hosts (100A, 100B) connected to any one of the plurality of forwarding nodes, and a policy management apparatus (320). The policy management apparatus (320) includes at least one of a first linking unit (topology information linking unit 324) that links the identifier of a host to be subject to access control and the identifier of the forwarding node connected to the host and a second linking unit (authentication information linking unit 323) that links the identifier of the host to be subject to the access control and the identifier of a user who uses the host. The policy management apparatus (320) holds an access control policy for identifying the host to be subject to the access control, using at least one of the identifier of the forwarding node and the identifier of the user. Each of the plurality of forwarding nodes (200A to 200C) transmit a set of the identifier of a host connected to own forwarding node and the identifier of the own forwarding node to the policy management apparatus (320). The authentication apparatus (310A, 310B, or 310C) transmits to the policy management apparatus (320) a set of the identifier of the host (100A or 100B) connected to the any one of the plurality of forwarding nodes and the identifier of the user. The policy management apparatus (320) refers to the access control policy. When the host connected to the one of the plurality of forwarding nodes is the host to be subject to the access control, the policy management apparatus (320) notifies content of the access control to the control apparatus (300) as an access control list. The control apparatus (300) generates the processing rule in accordance with the access control list, and sets the processing rule in (each of) the plurality of forwarding nodes (200A to 200C).

Herein, the processing rule may associate (i.e., link) a matching rule for identifying a packet to be processed and content of processing to be applied to the packet which matches the matching rule. The plurality of forwarding nodes (200A to 200C) may each transmit the set of the identifier of the host connected to own forwarding node and the identifier of the own forwarding node to the policy management apparatus (320) through the control apparatus (300). The control apparatus (300) may hold the set of the identifier of the host connected to the one of the plurality of forwarding nodes (200A to 200C) and the identifier of the one of the plurality of forwarding nodes as topology information, and may generate the processing rule for the packet in accordance with the access control list, based on the topology information.

In the present invention, by using the communication system such as an OpenFlow where the control apparatus concentratedly controls the forwarding nodes to obtain the states of the host of an access source and the network resource(s) of an access destination, information on those states is delivered to the policy management apparatus, the access control content of the host or the network resource which has changed is automatically updated, and a specific host or a specific network resource corresponding to an abstract description of the access control policy is automatically extracted, thereby updating access control content.

According to the present invention, there can be provided a method of easily and naturally linking a management function necessary for network control over a device such as a host or a network resource and a management function necessary for identifying a user, which are present as completely different functions. Thus, even if a lot of devices are present and connection states of the devices frequently change or even if a lot of users are present and connection states of the users frequently change, those different use management functions themselves are used as a trigger for updating ACL information generated from the policy and a source for obtaining information to be updated. A method of specifying a new access source and a new access destination can be thereby provided by linking both of the management functions, thus making it possible for an administrator and each user to update access control in real time without updating the access control policy with much time and effort.

According to the present invention, the following modes are possible.

(Mode 1)
A communication system may be the communication system according to the first aspect.

(Mode 2)
The processing rule may associate a matching rule for identifying a packet to be processed and content of processing to be applied to the packet which matches the matching rule.

(Mode 3)
Each of the plurality of forwarding nodes may transmit the set of the identifier of the host connected to own forwarding node and the identifier of the own forwarding node to the policy management apparatus through the control apparatus.

(Mode 4)
The control apparatus may hold the set of the identifier of the host connected to one of the plurality of forwarding nodes and the identifier of the one of the plurality of forwarding nodes as topology information, and may generate the processing rule for a packet in accordance with the access control list, based on the topology information.

(Mode 5)
The access control policy may include a list of an identifier of a forwarding node installed at a predetermined location in order to identify a host to be subject to the access control.

(Mode 6)
The access control policy may include a list of an identifier of a user corresponding to at least one of a predetermined organizational affiliation, a predetermined working place, a predetermined hierarchy of authority of the user, and a predetermined project being handled by the user, in order to identify a host to be subject to the access control.

(Mode 7)
A policy management apparatus may be the policy management apparatus according to the second aspect.

(Mode 8)
A communication method may be the communication method according to the third aspect.

(Mode 9)
In the communication method, the processing rule may associate a matching rule for identifying a packet to be processed and content of processing to be applied to the packet which matches the matching rule.

(Mode 10)
In the communication method, each of the plurality of forwarding nodes may transmit the set of the identifier of the host connected to own forwarding node and the identifier of the own forwarding node to the policy management apparatus through the control apparatus.

(Mode 11)
In the communication method, the control apparatus may hold the set of the identifier of the host connected to one of the plurality of forwarding nodes and the identifier of the one of the plurality of forwarding nodes as topology information, and may generate the processing rule for a packet in accordance with the access control list, based on the topology information.

(Mode 12)
In the communication method, the access control policy may include a list of an identifier of a forwarding node installed at a predetermined location in order to identify a host to be subject to the access control.

(Mode 13)
In the communication method, the access control policy may include the list of an identifier of a user corresponding to at least one of a predetermined organizational affiliation, a predetermined working place, a predetermined hierarchy of authority of the user, and a predetermined project being handled by the user, in order to identify a host to be subject to the access control.

(Mode 14)
A communication method may be the communication method according to the fourth aspect.

(Mode 15)
A program may be the program according to the fifth aspect.

(Exemplary Embodiment)

A communication system according to an exemplary embodiment will be described with reference to drawings. FIG. 1 is a diagram showing a configuration of the communication system according to this exemplary embodiment, as an example.

Referring to FIG. 1, the communication system comprises authentication apparatuses 310A to 310C, network resources 600A to 600C, hosts 100A to 100C, forwarding nodes 200A to 200C, a control apparatus 300, and a policy management apparatus 320.

The communication system includes three hubs each formed from a group of conference rooms, a group of office rooms, and a server pool. The authentication apparatus 310A, the network resources 600A, and the forwarding nodes 200A are provided in the group of conference rooms. The authentication apparatus 310B, the network resources 600B, and the forwarding nodes 200B are provided in the group of office rooms. The authentication apparatus 310C, the network resources 600C and the forwarding nodes 200C are provided in the server pool. Each host 100A accesses one of the forwarding nodes 200A provided in the conference rooms. On the other hand, each host 100B accesses one of the forwarding node 200B provided in the group of office rooms.

Terms in this exemplary embodiment will be described. Herein, a description will be directed to the hosts 100A, the authentication apparatus 310A, the forwarding nodes 200A, the network resources 600A in the group of conference rooms as an example. A similar description may also be applied to the group of office rooms and the server pool.

<Authentication Apparatus>

The authentication apparatus 310A authenticates the host 100A and a user who is using the host 100A. The authentication apparatus 310A may manage addresses of the hosts 100A and may issue the address of the host which has been authenticated, as part of an authentication procedure.

As shown in FIG. 1, the plurality of the authentication apparatuses 310A to 310C may be installed in the communication system. However, one authentication apparatus may manage the authentication procedure of the entirety of a network.

<Network Resources>

Each network resource 600A corresponds to an application server or the like to be used via the network. The network resource 600A may include a host held by a user. When the resource such as a file stored in a terminal of a certain user is accessed and shared with a different user, for example, the host is included in the network resource 600A. The network resource 600A also includes an authentication apparatus other than the authentication apparatus 310A, such as the one which uses a protocol that cannot be used unless after (i.e. before) authentication by the authentication apparatus 310A or a flow that cannot be defined according to an access control rule unless after authentication by the authentication apparatus 310A.

<Hosts>

The host 100A (each) corresponds to a computer which becomes a user terminal to be used by being connected to a network such as a hub, or a peripheral device such as a printer, a storage etc. to be used by being connected to the network. A network resource 600A which has been newly connected can also be treated as the host 100A.

<Host Management Information>

The control apparatus 300 stores "host management information." The host management information is management information on a host(s) 100A (including the network resource 600A) connected to the forwarding node(s) 200A. The host management information, for example, includes a set of the MAC (Media Access Control) address of the host(s) 100A, the IP (Internet Protocol) address of the host(s) 100A, the identifier of the forwarding node(s) 200A to which the host(s) 100A is connected, and the identifier of a connector for the forwarding node(s) 200A to which the host(s) 100A is connected.

<Authentication Information>

The authentication apparatus 310A collects and manages "authentication information." The authentication information is information for identifying a user and the host 100A. The authentication information is obtained when the authentication procedure for the user and the host 100A is performed in connecting the host 100A to or disconnecting the host 100A from the network by the user. The authentication information includes a set of the MAC address of the host 100A, the IP address of the host 100A, and the ID of the user who is using the host 100A, for example.

<Authentication Information Change Notification>

The authentication apparatus 310A notifies to the policy management apparatus 320 a change in the authentication information obtained by collection as an "authentication information change notification." The information to be notified includes a set of the MAC address of the host 100A, the IP address of the host 100A, the ID of the user who is using the host 100A, and a distinction between connection/disconnection of the host 100A, for example.

The authentication apparatus 310A manages various user information such as the organizational affiliation of the user, the working place of the user, the hierarchy of authority of the user, and a project being handled by the user, being associated with the user ID.

In addition to the set of the MAC address of the host 100A, the IP address of the host 100A, and the ID of the user who is using the host 100A, the above-mentioned authentication information may also include the above-mentioned various information associated with the user ID, for example.

<Topology Information>

The control apparatus 300 collects "topology information." The topology information is information for managing installation locations and connection destinations of the forwarding nodes 200A, and the hosts 100A and the network resources 600A connected to or disconnected from the forwarding nodes 200A. The topology information is formed using location information and connection/disconnection information. The location information, for example, includes a set of the identifier of each forwarding node 200, the identifier of the connector for the forwarding node 200, and locations where the forwarding node 200 and the connector are installed.

<Connection/Disconnection Information>

When any of other forwarding nodes 200B and 200C, various hosts 100A and various network resources 600A is connected to or disconnected from a forwarding node 200A, the forwarding node 200A notifies "connection/disconnection information" to the control apparatus 300. The connection/disconnection information, for example, includes a set of the identifier of the forwarding node 200A, the identifier of the connector for the forwarding node 200A to or from which the device is connected or disconnected, the MAC address of the connected or disconnected device, the IP address of the connected or disconnected device, and a distinction between connection and disconnection of the device. Accordingly, connection/disconnection information on a host 100A includes a set of the host management information and a distinction between connection and disconnection of the host 100A.

When the control apparatus 300 receives a notification of the connection/disconnection information, the control apparatus 300 accumulates the notified content, and then utilizes the accumulated content for connection relationships among the forwarding nodes 200A to 200C and calculation of a path for reaching the host 100A or the network resource 600A connected ahead of the forwarding node 200A.

The control apparatus 300 links (i.e., associates) the connection/disconnection information notified from the forwarding node 200A with information on the installation locations of the forwarding node 200A and its connector held by the control apparatus 300 as the location information, using the identifier of the forwarding node 200A and the identifier of the connector for the forwarding node 200A included in the location information and the connection/disconnection information, thereby allowing identification of a location to or from which the host 100A or the network resource 600A is connected or disconnected. The control apparatus 300 combines and manages these pieces of information as the topology information.

<Topology Information Change Notification>

The control apparatus 300 notifies to the policy management apparatus 320 a change in the collected topology information, such as a change in the connection state of the host 100A or the network resource 600A (birth, death, or transfer on the network, an address change, or the like), as a "topology information change notification." The topology information change notification on the host 100A includes a set of the host management information on the host 100A, the location of the host 100A, and a distinction between connection and distinction of the host 100A, for example.

By sharing the location information with the policy management apparatus 320 in advance, information on the location can also be omitted in the topology information change notification. The policy management apparatus 320 uses the identifier(s) of forwarding node(s) 200A and the identifier(s) of the connector for forwarding node(s) 200A to link the location information. The topology information change notification in this case includes a set of the host management information and a distinction between connection and disconnection, as in the connection/disconnection information.

<Access Control Policy>

The policy management apparatus 320 manages an "access control policy" stored in the access control policy storage unit 321. The access control policy is information abstractly describing content of access control, and provides a basis for generating ACL information to be delivered from the policy management apparatus 320 to the control apparatus 300.

The access control policy combines specifications of an access source and an access destination to describe the access control content by abstract specifications which are easily understandable by a person. The access control policy can specify address(es) of a host 100A as an access source and an access destination, for example.

The access control policy can also specify user(s) who is using the host 100A as the access source and the access destination, for example. The access control policy can specify the user(s) who is using the host 100A, as the access source and the access destination, by using the user information held by the authentication apparatus 310A, for example. The access control policy can specify the user(s) who is using the host 100A, by using the organizational affiliation of a "general affairs department," the working place of a "hub 1," the hierarchy of authority of a "department chief," the project being handled by the user of a "project 1," or the like.

By abstractly and indirectly specifying the access source and the access destination using these pieces of information on the user(s), the need for the administrator or the like to frequently update the policy for modifying the access control is eliminated, even when these pieces of information held by the users changes and the number of appropriate users to be subject to the access control change to be increased or decreased in the future.

When the organizational affiliation of a user has been changed, for example, it is not necessary to update the policy which specifies the access source and the access destination using the organizational affiliation. In this case, appropriate user(s) corresponding to organizational affiliations of a current time point is/are derived, the host(s) 100A being used by those users are derived, ACL information is regenerated as access control over those hosts 100A, and then the access control rule of the control apparatus 300 is updated.

The access control policy can specify the installation locations of the host 100A and the network resource 600A, for example, as the access source and the access destination.

As the access source and the access destination, the "host/network resource installed in a conference room 1," "the host/network resource installed in a building 1," "the host/network resource installed on a floor on a second floor," "the host/network resource installed in a company 1," or the like, for example, can be specified.

The installation locations of the host 100 and the network resource 600 corresponding to the access source and the access destination can be herein identified, because the control apparatus 300 collects the topology information and notifies the collected topology information to the policy management apparatus 320.

By abstractly and indirectly specifying the access source and the access destination using the locations, the need for the administrator or the like to frequently update the policy for modifying access control is eliminated, even when the location of the host 100A or the location of the network resource 600A changes and the numbers of the hosts 100A and the network resources 600A which are appropriate to be subject to the access control change to be increased or decreased in the future.

When the location of the host 100A or the location of the network resource 600A is changed, for example, it is not necessary to update the policy which specifies the access source and the access destination using the locations. The appropriate host 100A and the appropriate network resource 600A corresponding to locations of a current time point are derived, ACL information is regenerated as access control over those host 100A and network resource 600A, and then an access control rule of the control apparatus 300 is updated.

The access control policy can specify the access source and the access destination by complexly utilizing both of the users who are using the host(s) 100A and locations of the users, for example.

As the access source and the access destination, the "host/network resource installed in a room where a user 1 is present," the "host/network resource installed in a room where the user of an auditing department is present," the "host/network resource of the user who is present together with (present in a same location as) a user in charge," or the like, for example, can be specified.

The location of the user can be herein identified for the following reason. That is, by connecting a host 100 being used by the user to a forwarding node 200 to authenticate the host 100 by the authentication apparatus 310, the location of the host 100 can be identified by the connection/disconnection information on the host 100, and the user who is using the host 100 can be identified by information on the authentication, and the location of the host 100 and the user of the host 100 can be linked.

In addition to the above-mentioned way to use the access control policy, the following way to use the access control policy may also be conceived. That is, the communication system is linked up with a conference reservation system or the like. Then, in order to readily allow specification of access control necessary for a conference, the administrator or each user just provides some templates with respect to an access permission range (such as permission for access between participants) to the conference reservation system and then selects one of the templates. Then, the policy management apparatus 320 automatically reads information on the conference from the conference reservation system, and the access control policy of permitting access between only the "network resource and the host of a user in the conference room who participates in the conference during a period of time for the conference" is applied.

<Resource Information>

The policy management apparatus 320 manages "resource information" recorded in a resource information storage unit 322. The resource information is information on the hosts 100A and the network resources 600A. When generating ALC information from the access control policy, the policy management apparatus 320 refers to the resource information. The resource information includes a set of the MAC address and the IP address of a host 100 and a set of the MAC address and the IP address of a network resource 600, for example.

<Authentication Information Linking Unit>

An authentication information linking unit 323 links the authentication information. That is, by collating the MAC address included in the resource information and the MAC address included in the authentication information, the MAC addresses can be collectively referred to as one record. With this arrangement, the user ID included in the authentication information can be linked with the resource information. Thus, abstract specification of an access source and an access destination using user IDs can be performed in the access control policy, and ACL information can be generated from such an access control policy.

<Topology information Linking Unit>

A Topology information linking unit 324 links the topology information change notification. That is, by collating the MAC address included in the resource information and the MAC address included in the topology information change notification, the MAC addresses can be collectively referred to as one record. With this arrangement, information on the location included in the topology information change notification can be linked with the resource information and can be used. Thus, abstract specification of an access source and an access destination using the locations in the access control policy can be performed, and ACL information can be generated from such an access control policy.

Further, the user ID included in the authentication information and information on the location included in the topology information change notification can be linked for use, as a result of linking the authentication information and the topology information change notification. Thus, abstract specification of an access source and an access destination complexly using the user IDs and both of information associated with the user IDs and information on the locations can be performed in the access control policy, and ACL information can be generated from such an access control policy.

<Access Control List (ACL) Information>

The policy management apparatus 320 delivers "ACL information" to the control apparatus 300. The ACL information is information describing access control content, and is derived from the access control policy. The ACL information includes a set of the MAC address and the IP address of the host 100 of a transmission source, a set of the MAC address and the IP address of the network resource 600 of a transmission destination, content of communication between the transmission source and the transmission destination, the direction of the communication, and permission or denial of the content and the direction of the communication, for example.

<Access Control Rule>

The control apparatus 300 refers to the "access control rule" to determine permission or denial of communication of a flow. The access control rule includes the host management information on a transmission source and a transmission destination (network resource 600) which define the flow, and permission or denial of the content and the direction of communication between the transmission source and the transmission destination.

<Path>

The control apparatus 300 calculates a "path" in the network where the plurality of forwarding nodes 200A are connected. The path shows a way (route) of tracing one or more of the forwarding nodes 200A to go through until the flow reaches the network resource 600 of the transmission destination of the flow from the host 100 of the transmission source of the flow.

<Processing Rule>

The control apparatus 300 delivers a "processing rule (i.e., packet handling operations)" to the forwarding node 200A. The processing rule defines how to process (handle) a packet belonging to a certain flow when the forwarding node 200A receives the packet.

<Processing Rule Setting Request>

The forwarding node 200A delivers a "processing rule setting request" to the control apparatus 300. The processing rule setting request is used for requesting to the control apparatus 300 the processing rule that defines processing of a nonauthenticated packet which has arrived at the forwarding node 200A. The forwarding node 200A includes in the processing rule setting request the identifier of the forwarding node 200A which has received the packet and the identifier of its connector, and captured items of header information of the packet.

The configuration and operation of the communication system in this exemplary embodiment will be described below in further detail with reference to drawings. Herein, hosts 100A, authentication apparatus 310A, forwarding nodes 200A, and network resources 600A in a group of conference rooms will be described as an example. A similar description may also be applied to a group of office rooms and the server pool.

A host 100A transmits a packet to the authentication apparatus 310A and receives an authentication procedure of the own host 100A based on a response from the authentication apparatus 310A. The host 100A which has been authenticated transmits an access packet for using a network resource 600A to start communication with the network resource 600A based on a response from the network resource 600A.

The authentication apparatus 310A authenticates the host 100A and the user, upon receipt of a request from the host 100A. The authentication apparatus 310A delivers information on the host 100A and the user that have been authenticated to the policy management apparatus 320, as an authentication information change notification.

The network resource 600A starts communication for using a service, upon receipt of a request from the host 100A.

The forwarding node 200A obtains a packet transmitted by (each of) the host 100A, the authentication apparatus 310A, and the network resource 600A, and makes a processing rule setting request to the control apparatus 300. The forwarding node 200A processes the packet(s) transmitted by the host 100A, the authentication apparatus 310A, and the network resource 600A, according to the processing rule delivered from the control apparatus 300.

The control apparatus 300 checks the access control rule and performs path calculation when packet information described in the processing rule setting request delivered from the forwarding node 200A indicates the packet(s) for accessing the network resource 600A from the host 100A. When the flow is to be permitted, the control apparatus 300 generates the processing rule which permits communication of the packet(s) from the host 100A to the network resource 600A, and then delivers the processing rule to the forwarding node 200A. The control apparatus 300 collects connection/disconnection information delivered from the forwarding node 200A, and stores the connection/disconnection information in the topology information storage unit 301 as a material for the path calculation, and also generates a topology information change notification and then delivers the generated topology information change notification to the policy management apparatus 320.

The policy management apparatus 320 includes the topology information linking unit 324 and the authentication information linking unit 323.

The topology information linking unit 324 searches one of the MAC addresses included in the existing resource information in the resource information storage unit 322 that matches the MAC address included in the topology information that has been changed, based on the topology information change notification delivered from the control apparatus 300. In a case the searched MAC address is present, the resource information is updated by the topology information which has been changed. On the other hand, in a case the MAC address that matches the searched MAC address is not present, the topology information linking unit 324 adds to the resource information storage unit 322 the MAC address included in the topology information which has been changed, as new resource information. The topology information linking unit 324 links the location information included in the topology information. When the topology information change indicates the resource being used in the access control policy being used, ACL information is generated, based on the resource of the location being used in resource specification of the access control policy being used and the access control policy in the access control policy storage unit 321, and then delivers the ACL information to the control apparatus 300.

On the other hand, the authentication information linking unit 323 updates the resource information storage unit 322 using authentication information described in the authentication information change notification delivered from the authentication apparatus 310A. When the authentication information change matches the resource being used in the resource specification of the access control policy being used, or when the user ID linked with the resource to be updated matches the user ID being used in the resource specification of the access control policy at that point, the authentication information linking unit 323 generates ACL information based on the access control policy in the access control policy storage unit 321, and delivers the generated ACL information to the control apparatus 300.

Figure 2:
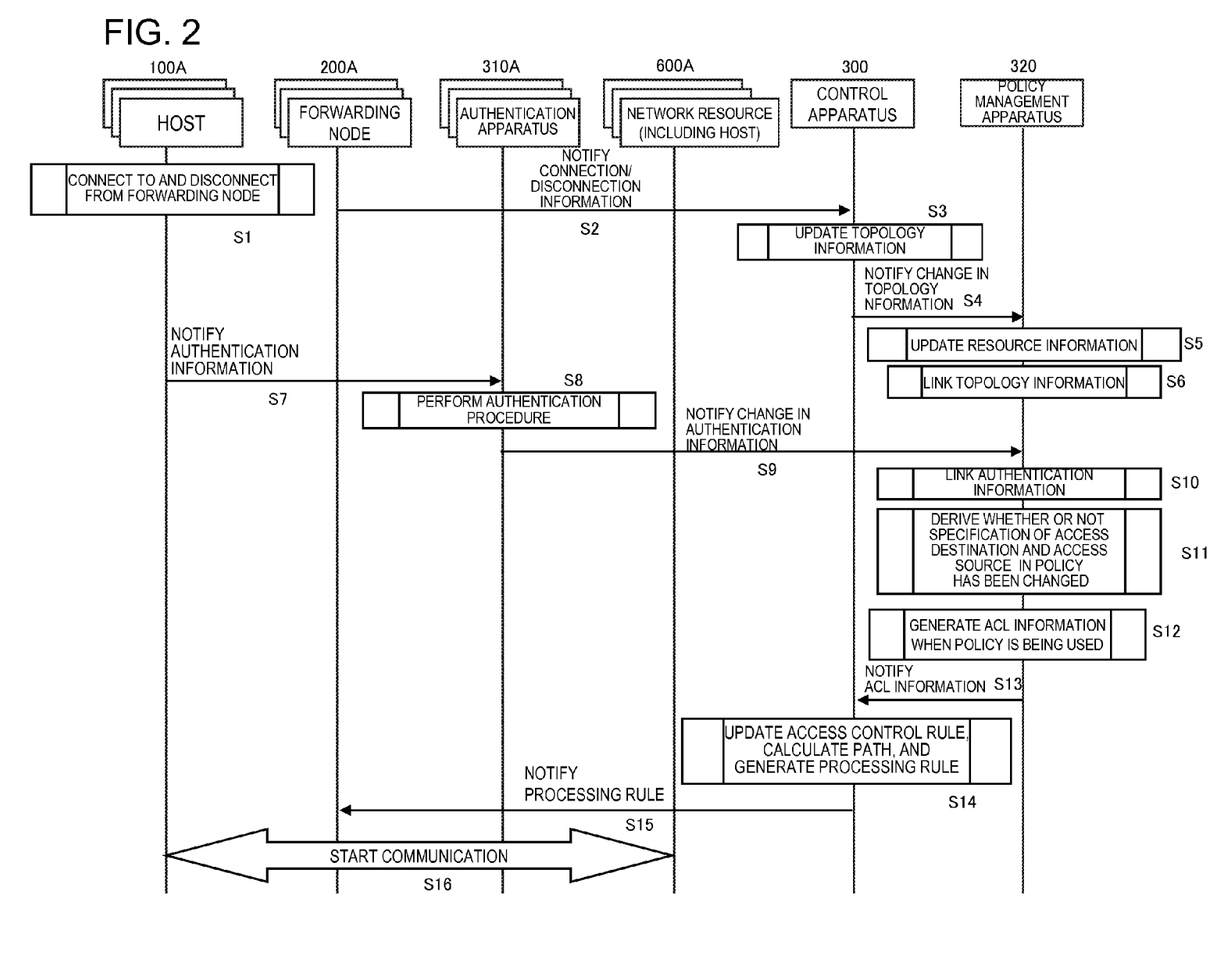
FIG. 2 is a sequence diagram showing an operation of the communication system according to the exemplary embodiment, as an example.

The operation of the communication system in this exemplary embodiment will be described with reference to a drawing. FIG. 2 is a sequence diagram showing the operation of the communication system (in FIG. 1) as an example. Herein, a description will be directed to a process from connection of a host (one of the hosts) 100A to a start of communication with a network resource (one of the network resources) 600A in the group of conference rooms, as an example.

First, the host 100A connects itself to the forwarding node 200A in order to perform network connection (in step S1).

Next, the forwarding node 200A generates connection/disconnection information on the connected host 100A, and then delivers the generated connection/disconnection information to the control apparatus 300 (in step S2). The control apparatus 300 reads the connection/disconnection information and then updates the topology information stored in the topology information storage unit 301 (in step S3). Further, the control apparatus 300 generates a topology information change notification, and delivers the generated topology information change notification to the policy management apparatus 320 (in step S4).

Next, the topology information linking unit 324 reads the topology information change notification to compare the MAC addresses included in both of the existing resource information stored in the resource information storage unit 322 and the topology information change notification. When the identical MAC address is present in the existing resource information, the topology information linking unit 324 updates content of the existing resource information (such as the IP address), by the content of the topology change notification (in step S5). On the other hand, when the corresponding resource information is not present, the topology information linking unit 324 adds the resource information to the resource information storage unit 322 as new host management information. The topology information linking unit 324 reads the topology information change notification to compare address information included in both of the topology information change notification and the resource information stored in the resource information storage unit 322, such as the MAC addresses to link the resource information of the identical MAC address and the topology information change notification (in step S6). The identifier of the forwarding node, the identifier of the connector for the forwarding node, and the location information can be linked with the resource information and can be referred to, by this linking.

Next, the host 100A requests the authentication apparatus 310A to perform the authentication procedure so as to authenticate the host 100A and the user (in step S7).

Next, the authentication apparatus 310A performs the authentication procedure of the host 100A which has requested the authentication procedure and the user of the host 100A (in step S8). The authentication procedure pairs (or combines into a set) address information of the host 100A with information on the user using the host 100A. The address information such as the IP address of the host 100A may be modified or changed in the authentication procedure, depending on the system. The authentication apparatus 310A delivers information newly obtained by the authentication procedure to the policy management apparatus 320 as an authentication information change notification (in step S9).

Next, the authentication information linking unit 323 performs reading the authentication information change notification to compare the address information such as the MAC addresses included in both of the resource information stored in the resource information storage unit 322 and the authentication information change notification to link the resource information of the identical MAC address and the authentication information change notification (in step S10). Information on the user such as the user ID can be linked with the resource information and can be referred to, by this linking.

Next, the policy management apparatus 320 derives whether or not the changed content of the resource information that has been newly linked or updated is a change in specification of the access source (subject) and/or the access destination (resource) described in the access control policy, by comparing the changed content of the resource information that has been newly linked or updated with specification content of the access control policy that has been already adopted (from which ACL information has been already generated and which has been already delivered to the control apparatus 300) (in step S11). In case the ID of a certain user is included in authentication information linked to the resource information and in case the host corresponding to the user ID is specified as the resource of the access control policy by using the user ID, for example, the policy management apparatus 320 determines that the changed content is a change in this access control policy. Step S11 may be executed after step S6, or both of step S11 and step S6 may be executed.

When the access control policy that is related to the linked or updated resource information and that has already been adopted is found in step S11, the policy management apparatus 320 regenerates ALC information, based on the access control policy related to these pieces of information (in step S12). With this arrangement, access control content is automatically updated to appropriate content, without updating the access control policy itself. On the other hand, when the access control policy targeted for the determination is not found, the policy management apparatus 320 finishes the step without regenerating the ACL information. Then, when further new linking or updating of the resource information occurs and step S11 is executed again, the policy management apparatus 320 follows the result of determination at that point. The policy management apparatus 320 delivers the generated ACL information to the control apparatus 300 (in step S13).

Next, the control apparatus 300 updates the access control rule, based on the delivered ACL information, performs path calculation, and then generates the processing rule (in step S14). The control apparatus 300 may update only the access control rule in this stage, and then may perform path calculation and may generate the processing rule after the control apparatus 300 has received a request for setting the processing rule from the forwarding node 200A. The control apparatus 300 delivers the generated processing rule to the forwarding node 200A (in step S15).

With this arrangement, the forwarding node 200A is set to a state where access control described in the access control policy is modified in accordance with the newly linked and updated resource information.

Next, the host 100A communicates with the network resource 600A through the access control by the forwarding node 200A (in step S16). The network resource 600A may herein include the host 100A itself and a host(s) other than the host 100A.

The policy management apparatus 320, the control apparatus 300, and the forwarding nodes 200A, the forwarding nodes 200B, and the forwarding nodes 200C may be respectively constructed by separate individual computer systems, as shown in FIG. 1. Alternatively, the policy management apparatus 320, the control apparatus 300, and the forwarding nodes 200A to 200C may be partially or wholly implemented by a same computer system.

The host or hosts 100A to 100C may be implemented by a CPU or CPUs of an information processing device that operates according to a program, a storage medium such as RAM, and a communication interface for performing communication with the authentication apparatus 310 and the network resources 600.

Similarly, the authentication apparatus(es) 310A to 310C and the network resources 600A to 600C may be implemented by the CPU or CPUs of an information processing device that operates according to a program, a storage medium such as RAM, and a communication interface for performing communication with the host(s) 100A to 100C.

The forwarding node(s) 200A to 200C may be implemented by the CPU or CPUs of an information processing device that operates according to a program, a storage medium such as RAM, a communication interface for performing communication with the control apparatus 300, and a communication interface for obtaining content of communication among the host(s) 100A to 100C, the authentication apparatus(es) 310A to 310C, and the network resource(s) 600A to 600C.

Further, the control apparatus 300 may be implemented by the CPU of an information processing device that operates according to a program, a storage medium such as RAM, and a communication interface for performing communication with the policy management apparatus 320 and the forwarding node(s) 200A to 200C.

The policy management apparatus 320 may be implemented by a CPU of an information processing device that operates according to a program, a storage medium such as RAM, and a communication interface for performing communication with the control apparatus 300, a communication interface for performing communication with the authentication apparatus(es) 310A to 310C, and a storage medium such as RAM or hard disk.

As described above, a communication system according to this exemplary embodiment may comprise:

a plurality of forwarding nodes processing a received packet according to a processing rule that associates a matching rule for identifying a packet to be processed and processing content to be applied to the packet that matches the matching rule, and transmitting a set of the identifier of own forwarding node and the identifier of a host connected to the own forwarding node;

an authentication apparatus which authenticates a user of the host and then transmits to a policy management apparatus a set of the identifiers of the user and the host obtained by the procedure of the authentication;

a control apparatus which transmits to the policy management apparatus information on the host connected to the forwarding node obtained from the forwarding node, and sets the processing rule based on description of an access control list with respect to the host obtained from the policy management apparatus; and the policy management apparatus including:

a topology information linking unit for linking the identifier of the host to be subject to access control and the identifier of the forwarding node to which the host is connected; and an authentication information linking unit for linking the identifier of the host to be subject to the access control and the identifier of the user who is using the host;

the policy management apparatus generating the access control list from an access control policy for identifying the host to be subject to the access control, based on a description using at least one of the identifier of the user and the identifier of the forwarding node, and then transmitting the generated access control list to the control apparatus.

In other words, a communication system according to this exemplary embodiment may comprise:

a plurality of forwarding nodes processing a received packet according to a processing rule that associates a matching rule for identifying a flow and processing content to be applied to a packet that matches the matching rule, and notifies connection/disconnection information of a host or a network resource detected by the received packet to a control apparatus together with address information on those host and network resource;

an authentication apparatus which authenticates the host connected to the forwarding node and a user who uses the host;

a policy management apparatus which generates information on an access authority, using the detected connection/disconnection information on the host that has succeeded in the authentication and the network resource as a trigger or an information source, and then provides the information on the access authority to a control apparatus; and the control apparatus which notifies to the policy management apparatus the connection/disconnection information on the host and the network resource(s) collected from the forwarding node, generates a path between the host that has succeeded in the authentication and the resource that may be accessed by the host, based on the information on the access authority received from the policy management apparatus, and then sets the processing rule in the forwarding node on the path.

According to the communication system mentioned above, there can be provided a method of easily and naturally linking a management function necessary for network control over a device such as a host or a network resource and a management function necessary for identifying a user, which are present as completely different functions. Thus, even if a lot of devices are present and connection states of the devices frequently change or even if a lot of users are present and connection states of the users frequently change, those different use management functions themselves are used as a trigger for updating ACL information generated from the policy and a source for obtaining information to be updated. A method of specifying a new access source and a new access destination can be thereby provided by linking both of the management functions, thus making it possible for an administrator and individual user(s) to update access control in real time without updating the access control policy with much time and effort.

Further, according to the present invention, a system capable of performing appropriate access control can be constructed just by including an access control policy capable of specifying an abstract access source and an abstract access destination, without much time and effort expended by a administrator or each user, in network access control in the system of an enterprise or the like. The appropriate access control can be performed when each user performs access control following an access control range which freely switches between hubs, which covers a lot of users and a lot of devices according to the intended use, and which frequently changes.

Each disclosure of the Citation List such as the above-listed Patent Literature is incorporated herein by reference thereto. Modification and adjustment of each exemplary embodiment are possible within the scope of the overall disclosure (including the claims) of the present invention and the technical concept of the present invention. Various combinations and selections of various disclosed elements (including each element in each claim, each element in each exemplary embodiment, and each element in each drawing) are possible within the scope of the claims of the present invention. That is, the present invention includes various variations and modifications that could be made by those skilled in the art according to the overall disclosure including the claims and the technical concept. With respect to a numerical value range described herein in particular, an arbitrary numerical value and a small range included in the numerical value range should be construed to be specifically described even unless otherwise explicitly described.

REFERENCE SIGNS LIST 100, 100A-100C host
200, 200A-200C forwarding node
300 control apparatus
301 topology information storage unit
310, 310A-310C authentication apparatus
320 policy management apparatus
321 access control policy storage unit
322 resource information storage unit
323 authentication information linking unit
324 topology information linking unit
600, 600A-600C network resource

What is claimed is:

1. A communication system, comprising:
a plurality of forwarding nodes processing a packet according to a processing rule;
a control apparatus that controls the plurality of forwarding nodes;
an authentication apparatus that authenticates a user who uses a host connected to one of the plurality of forwarding nodes; and
a policy management apparatus that includes at least one of (a) a first linking unit that links an identifier of a host to be subject to access control and an identifier of a forwarding node to which the host is connected and (b) a second linking unit that links an identifier of a host to be subject to access control and an identifier of a user who uses the host, the policy management apparatus holding an access control policy for identifying a host to be subject to the access control using at least one of the identifier of the forwarding node and the identifier of the user, wherein
each of the plurality of forwarding nodes transmits to the policy management apparatus a set of an identifier of a host connected to own forwarding node and an identifier of the own forwarding node;
the authentication apparatus transmits to the policy management apparatus a set of an identifier of a host connected to one of the plurality of forwarding nodes and an identifier of a user,
the policy management apparatus refers to the access control policy and, if a host connected to one of the plurality of forwarding nodes is a host to be subject to the access control, notifies content of the access control to the control apparatus as an access control list, and
the control apparatus generates a processing rule in accordance with the access control list and sets the generated processing rule in the plurality of forwarding nodes.

2. The communication system according to claim 1, wherein
the processing rule associates a matching rule for identifying a packet to be processed and content of processing to be applied to the packet that matches the matching rule.

3. The communication system according to claim 1, wherein each of the plurality of forwarding nodes transmits the set of the identifier of the host connected to own forwarding node and the identifier of the own forwarding node to the policy management apparatus through the control apparatus.

4. The communication system according to claim 3, wherein the control apparatus holds the set of the identifier of the host connected to one of the plurality of forwarding nodes and the identifier of the one of the plurality of forwarding nodes as topology information, and generates the processing rule for the packet in accordance with the access control list, based on the topology information.

5. The communication system according to any one of claim 1, wherein the access control policy includes a list of an identifier of a forwarding node installed at a predetermined location in order to identify a host to be subject to the access control.

6. The communication system according to any one of claim 1, wherein the access control policy includes a list of an identifier of a user corresponding to at least one of a predetermined organizational affiliation, a predetermined working place, and a predetermined hierarchy of authority of the user, and a predetermined project being handled by the user, in order to identify a host to be subject to the access control.

7. A policy management apparatus in a communication system comprising a plurality of forwarding nodes processing a packet according to a processing rule, a control apparatus that generates the processing rule in accordance with an access control list and sets the processing rule the plurality of forwarding nodes, and an authentication apparatus that authenticates a user who uses a host connected to one of the plurality of forwarding nodes;
the policy management apparatus comprising:
at least one of (a) a first linking unit that links an identifier of a host to be subject to access control and an identifier of a forwarding node to which the host is connected, and (b) a second linking unit that links an identifier of a host to be subject to access control and an identifier of a user who uses the host; and
an access control policy storage unit that holds an access control policy for identifying a host to be subject to the access control, using at least one of an identifier of a forwarding node and an identifier of a user, wherein
the policy management apparatus receives from each of the plurality of forwarding nodes a set of an identifier of a host connected to own forwarding node and an identifier of the own forwarding node,
the policy management apparatus receives from the authentication apparatus a set of an identifier of a host connected to one of the plurality of forwarding nodes and an identifier of a user, and
the policy management apparatus refers to the access control policy and, if a host connected to one of the plurality of forwarding nodes is a host to be subject to the access control, notifies content of the access control to the control apparatus as the access control list.

8. A communication method in a communication system comprising a plurality of forwarding nodes, a control apparatus that controls the plurality of forwarding nodes, an authentication apparatus that authenticates a user who uses a host connected to one of the plurality of forwarding nodes, and a policy management apparatus that holds an access control policy for identifying a host to be subject to access control using at least one of an identifier of a forwarding node and an identifier of a user;
the communication method comprising:
by each of the plurality of forwarding nodes, transmitting to the policy management apparatus a set of an identifier of a host connected to own forwarding node and an identifier of the own forwarding node;
by the authentication apparatus, transmitting to the policy management apparatus a set of an identifier of a host connected to one of the plurality of forwarding nodes and an identifier of a user;
by the policy management apparatus, performing at least one of (a) linking an identifier of a host to be subject to the access control and an identifier of a forwarding node to which the host is connected, and (b) linking an identifier of a host to be subject to the access control and an identifier of the user who uses the host;
by the policy management apparatus, referring to the access control policy and, if a host connected to one of the plurality of forwarding node is a host to be subject to access control, notifying to the control apparatus content of the access control as an access control list;
by the control apparatus, generating a processing rule for a packet in accordance with the access control list and setting the processing rule in the plurality of forwarding nodes; and
by the plurality of forwarding nodes, processing a packet according to the processing rule.

9. The communication method according to claim 8, wherein
the processing rule associates a matching rule for identifying a packet to be processed and content of processing to be applied to the packet that matches the matching rule.

10. The communication method according to claim 8, wherein
each of the plurality of forwarding nodes transmits the set of the identifier of the host connected to own forwarding node and the identifier of the own forwarding node to the policy management apparatus through the control apparatus.

11. The communication method according to claim 10, wherein
the control apparatus holds the set of the identifier of the host connected to the one of the plurality of forwarding nodes and the identifier of the one of the plurality of forwarding nodes as topology information, and generates the processing rule for a packet accordance with the access control list, based on the topology information.

12. The communication method according to any one of claim 8, wherein the access control policy includes a list of a identifier of a forwarding node installed at a predetermined location in order to identify a host to be subject to the access control.

13. The communication method according to any one of claim 8, wherein the access control policy includes a list of an identifier of a user corresponding to at least one of a predetermined organizational affiliation, a predetermined working place, and a predetermined hierarchy of authority of the user, and a predetermined project being handled by the user, in order to identify a host to be subject to the access control.

14. A communication method in a communication system comprising a plurality of forwarding nodes processing a packet according to a processing rule, a control apparatus that generates the processing rule in accordance with an access control list and sets the processing rule in the plurality of forwarding nodes, and an authentication apparatus that authenticates a user who uses a host connected to one of the plurality of forwarding nodes;
the communication method comprising, by a policy management apparatus that holds an access control policy for identifying a host to be subject to access control using at least one of an identifier of a forwarding node and an identifier of a user:
at least one of (a) linking an identifier of a host to be subject to the access control and an identifier of a forwarding node to which the host is connected, and (b) linking an identifier of a host to be subject to the access control and an identifier of the user who uses the host;
receiving from each of the plurality of forwarding nodes a set of an identifier of a host connected to the each of the plurality of forwarding nodes and an identifier of the each of the plurality of forwarding nodes;
receiving from the authentication apparatus a set of an identifier of a host connected to one of the plurality of forwarding nodes and an identifier of a user; and
referring to the access control policy and, if the host connected to one of the plurality of forwarding node is the host to be subject to the access control, notifying to the control apparatus content of the access control as the access control list.

15. A non-transitory computer-readable recording medium storing a program executed on a computer provided in a policy management apparatus in a communication system, the communication system comprising a plurality of forwarding nodes processing a packet according to a processing rule, a control apparatus that generates the processing rule in accordance with an access control list and sets the processing rule in each of the plurality of forwarding nodes, and an authentication apparatus that authenticates a user who uses a host connected to one of the plurality of forwarding nodes, the policy management apparatus holding an access control policy for identifying a host to be subject to access control using at least one of an identifier of a forwarding node and an identifier of a user;

the program causing the computer to execute:

at least one of (a) linking an identifier of a host to be subject to the access control and an identifier of a forwarding node to which the host is connected, and (b) linking an identifier of a host to be subject to the access control and an identifier of a user who uses the host;

receiving from each of the plurality of forwarding nodes a set of an identifier of a host connected to own forwarding node and an identifier of the own forwarding node;

receiving from the authentication apparatus a set of an identifier of a host connected to one of the plurality of forwarding nodes and an identifier of a user; and referring to the access control policy and, if the host connected to one of the plurality of forwarding node is the host to be subject to the access control, notifying to the control apparatus content of the access control as the access control list.

* * * * *